March 6, 1934.  C. G. WENNERSTROM  1,949,702
CLUTCH
Filed Oct. 21, 1931
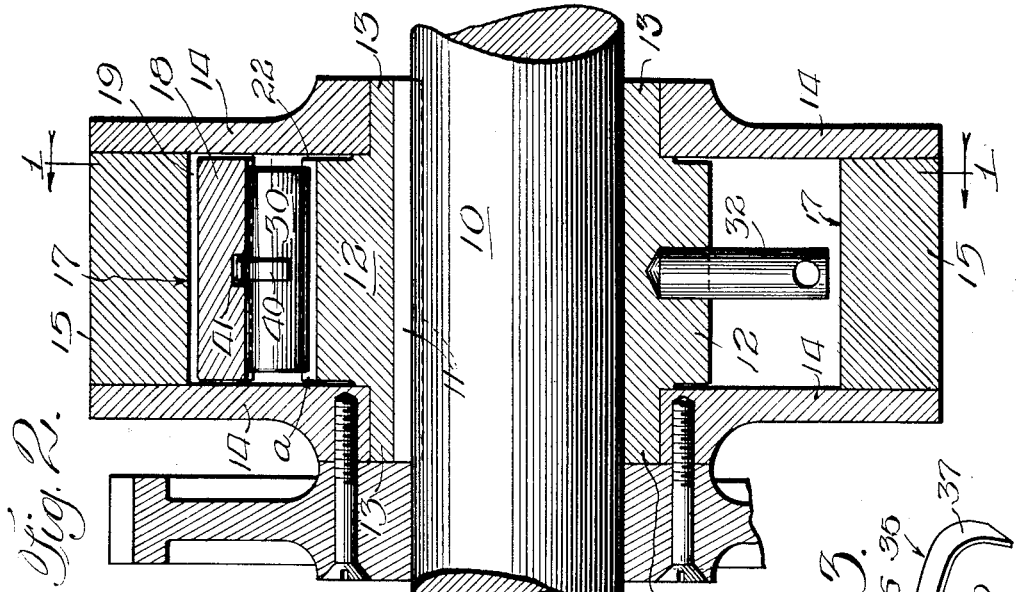
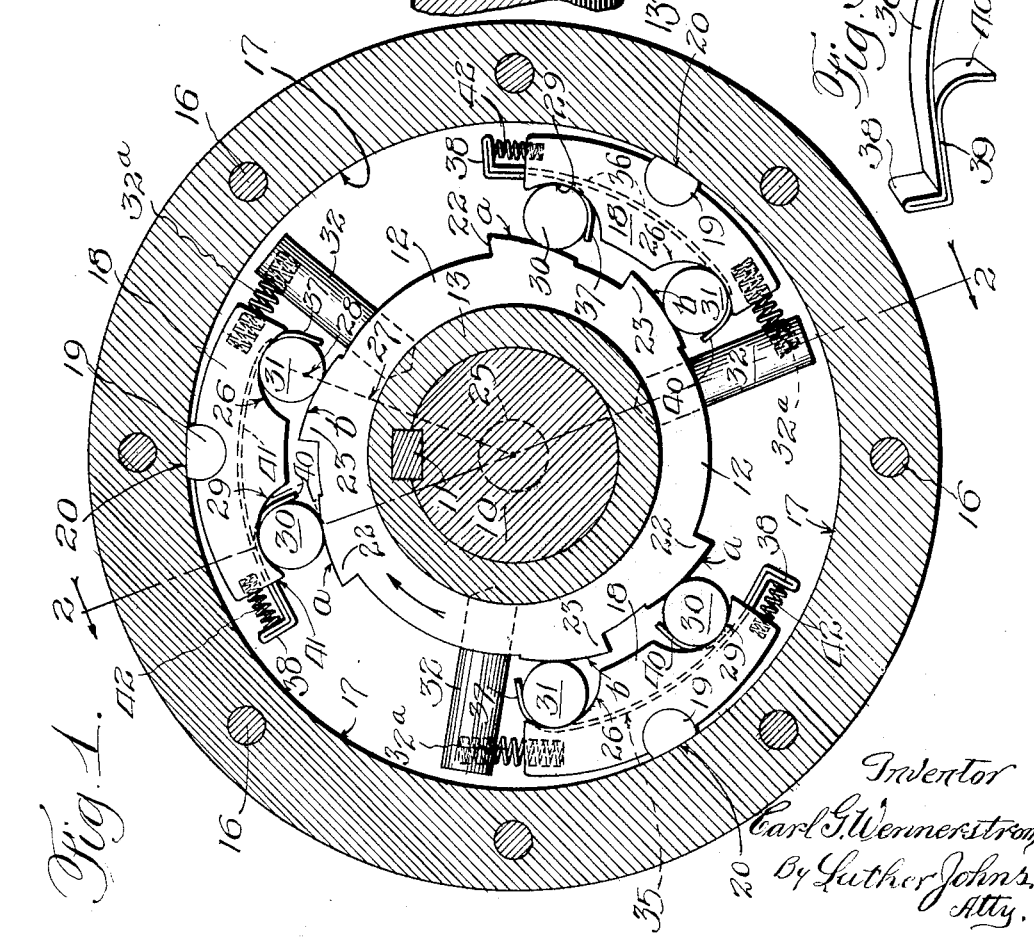

Patented Mar. 6, 1934

1,949,702

UNITED STATES PATENT OFFICE 1,949,702

CLUTCH

Carl G. Wennerstrom, Evanston, Ill., assignor to Universal Gear Corporation, Chicago, Ill., a corporation of Illinois Application October 21, 1931, Serial No. 570,075

2 Claims. (Cl. 192—41)

This invention relates to clutches, chiefly of the one-way or overrunning kind. Its chief object is to provide a simple and highly effective clutch whereby power, which will usually be rotative, may be communicated intermittently to the driven member in various ways, as by a reciprocating or ratcheting-like operation, or with the driving member running continuously in one direction but at lower rates of speed from time to time, with the driven member continuing to move forward or overrunning the driving member when not actually being driven thereby. Other objects and advantages will appear hereinafter.

In the drawing Figure 1 is a medial sectional view through a clutch mechanism embodying this invention, as on the broken line 1—1 of Fig. 2;

Fig. 2 is a horizontal sectional view of the same, as on the broken line 2—2 of Fig. 1, the section line going around one of the rollers; and Fig. 3 is a perspective view of a spring member.

On shaft 10 there is mounted positively, as by means of a spline 11, an inner clutch member 12 provided with cylindrical extensions 13 serving as bearings for two circular plate-like elements 14 constituting part of the outer clutch member. Between these plates 14 there is a cylindrical ring 15 held to plates 14 by bolts 16.

The inner surface 17 of ring 15 is nicely finished on lines concentric with the axis of the shaft and constitutes a clutching surface against which bears an elongated clutch piece 18 at a place intermediate its ends. A wear piece 19 which interfits with and is held by clutch piece 18 for turning movement and automatic adjustment may carry the surface of the clutch piece adapted to bind against the clutching surface 17. This bearing surface marked 20 on wear piece 19 is preferably substantially wide in the circumferential direction and extends transversely of the device substantially the distance between the side plates 14 and is cylindrically shaped to fit nicely upon the cylindrical clutching surface 17. Fig. 2 shows that the clutch piece 18 likewise extends substantially the full distance between the side plates 14, and in practice there is only enough clearance between the clutch piece 18 and walls 14 to provide for free running between the side plates 14 and the clutch piece.

There are means for forcing the clutch piece radially outward in the device illustrated when one clutch member turns relatively to the other in a given direction. Either the inner member 12—13 or the outer member 14—15 may be the driving or the driven member. For purposes of this description we may consider the inner member to be the driving member and that in Fig. 1 it is being turned in the clockwise direction to drive the outer member in the same direction. The desideratum is to cause the clutch piece 18 to bind upon the clutching surface as soon as the inner member turns slightly in the forward direction relative to the outer member, and to provide that on a cessation or lowering of the rate of driving movement the outer member may continue to travel forward or overrun, the clutch illustrated being a one-way, free-wheel, or overrunning clutch.

To these ends I provide on the periphery of inner member 12 a plurality of outwardly-extending wedge or cam projections 22 and 23 in pairs. Three of such pairs are shown, which number is sufficient for all ordinary purposes. I have shown the clutch as including three of the clutch pieces, and in general, three complete units each of which effects a clutching action between the inner and outer members—all operating at the same time. One such unit would suffice in some instances. A plurality of them equally spaced apart circumferentially is preferred not only because of the greater clutching effects provided but also in order to equalize the radial strains upon the outer ring 15 and serve to preserve it from distortion without making it excessively heavy. Like parts of the three units are given the same reference characters.

The projections 22 and 23 have wedging or cam surfaces marked $a$ and $b$ respectively and which are on arcuate lines in side view and are drawn from radii of equal length and which are tangent to the same side of a circle as 25 (at the left thereof as viewed in Fig. 1) concentric with the shaft, the size of which circle determines the amount or extent of the difference between the high and low ends of the wedging or cam surface $a$ or $b$, or, in other words, it determines the effective angularity of the wedging or cam surface. Thus if these wedging surfaces $a$ and $b$ were desired to be given greater throw the circle 25 would be enlarged. The proportions illustrated are found to be satisfactory, but there is nothing particularly critical in the degree of the wedging or cam surfaces $a$ and $b$. These cam surfaces $a$ and $b$ extend transversely of the device substantially the full distance between the side plates 14 as shown in Fig. 2 and are carried by projections which are integral with the inner member 12.

At one end portion of the clutch piece 18 as viewed in Fig. 1, and on the inner side thereof, is an arcuate seat 26 drawn in cross view by a radius terminating in radius marked 27, the radius defining arc 26 in Fig. 1 being at point 28. The position of center 28 is not critical, but it is preferably on radius 27. The desideratum in this respect is to provide a cylindrically-shaped seat for a roller at each circumferentially-directed end portion of the clutch piece and of such nature that the roller is held pocketed therein for a slight rolling action.

Seat 29 is the same as seat 26. In these seats are cylindrical rollers 30 and 31 respectively, and these rollers bear against wedging surfaces $a$ and $b$ respectively. These several parts are so closely in association with each other that the clutch piece, at a place between its ends as viewed transversely is pressed tightly against clutching surface 17 by wedging or cam surfaces as $a$ and $b$ transmitting outward pressure through rollers 30 and 31, and this binding action occurs substantially instantly that the inner member turns slightly in the clockwise direction relative to the outer clutch member.

Issuing radially from inner member 12 is a stud 32 bored to receive a compression spring 32$a$, and the adjacent end of the clutch piece is similarly bored to receive this spring whereby the clutch piece as a whole, carrying with it the rollers 30 and 31, is pressed resiliently and yieldingly to the left, as viewed in Fig. 1, or in a direction which tends to cause the rollers 30 and 31 to climb upward or outward upon the cam surfaces $a$ and $b$ respectively, and also in a direction which causes the clutch piece 18 to be maintained in close contact with the friction or clutching surface 17. The outer member may rotate in the clockwise direction or overrun the inner member since the friction at the wear surface 20 tends to carry the clutch piece as a whole, and with it the rollers 30 and 31, in the clockwise direction against the tension of spring 32$a$, which releases the clutch piece from the binding action of wedge surfaces $a$ and $b$. Spring 32$a$ maintains the clutch piece in position for immediate gripping action since it maintains the wear surface at 20 in frictional engagement with the clutching surface 17. Should the device be idle and the inner member be then turned in the clockwise direction the wear surface at 20 would be immediately bound against the clutching surface, and the same would be true if the outer member were overrunning and the inner member should pick up speed sufficient to drive the outer member.

In order to hold the rollers in a difinite position in their seats respectively whereby a certain looseness is avoided, and to insure that the clutching action shall take place immediately, I provide resilient means which press the rollers in the direction of the "high" or more-radially-outward parts of the wedging or cam surfaces $a$ and $b$, these means being shown as a leaf spring marked as a whole 35 in Fig. 3 and comprising a body part 36 bent downward at 37 to fit around roller 31, the other end being bent upward at 38 substantially at right angles to the body 36, turned back upon itself and extending forward at 39 and terminating in a hook-like part 40 fitting upon roller 30. The clutch piece is recessed outwardly at 41 to accommodate this leaf spring. Fig. 1 shows a spring 42 seated in a hole in the clutch piece and pressing against the seat 38 of this spring 35. Spring 42 thus presses the rollers to the left, as viewed in Fig. 1, which also causes a tight fit between the rollers and the clutch piece and between the rollers and the cam surfaces $a$ and $b$. Leaf spring 35 carries the rollers along with the clutch piece under the tension of spring 32$a$.

Power may be applied to either the inner or outer member to drive the other. If power were applied to the outer member to drive it in the anti-clockwise direction it would drive the inner member while permitting the inner member to overrun in the same direction. The wedging surfaces could be carried by the outer member, the other parts being shaped accordingly.

The present device may be made according to manufacturing methods well understood in the mechanical arts. In my practice I employ steel throughout, the clutching surface, the cam surfaces and the rollers being nicely finished.

I contemplate as being included in these improvements all such changes, variations and departures from what is thus specifically illustrated and described as fall within the scope of the appended claims.

I claim:

1. In a clutch of the character described, the combination of a driving member and a driven member close together, one thereof having an elongated clutching surface, a clutch piece bearing against said clutching surface at a limited area intermediate the ends of the clutch piece, the clutch piece having a curved transversely-arranged seat near each of its ends to receive the outer curved surface of a cylindrical roller, means providing a pair of longitudinally-arranged cam surfaces carried by the other one of said members and directed toward said clutching surface, each of said cam surfaces being relatively low at one end and relatively high at the other end, and a cylindrical roller in each of said seats and contacting said cam surfaces respectively, the arrangement providing that said cam surfaces are in driving relation, through the associated rollers, to the clutch piece.

2. In a clutch of the character described, the combination of a rotary driving member and a coaxial rotary driven member, one thereof having a coaxial clutching surface, an elongated clutch piece adjacent to said surface and bearing there-against intermediate the ends of the clutch piece, the other one of said members having a pair of cam surfaces spaced apart circumferentially and having relatively high and low faces directed toward said clutching surface and toward said clutch piece, the clutch piece being between said clutching surface and said cam surfaces, and rollers, one for each cam surface, contacting the cam surfaces respectively and the clutch piece near its respective ends, with means for yieldingly forcing the clutch piece in a given circumferential direction to maintain the clutch piece in contact with said clutching surface.

CARL G. WENNERSTROM.